UNITED STATES PATENT OFFICE.

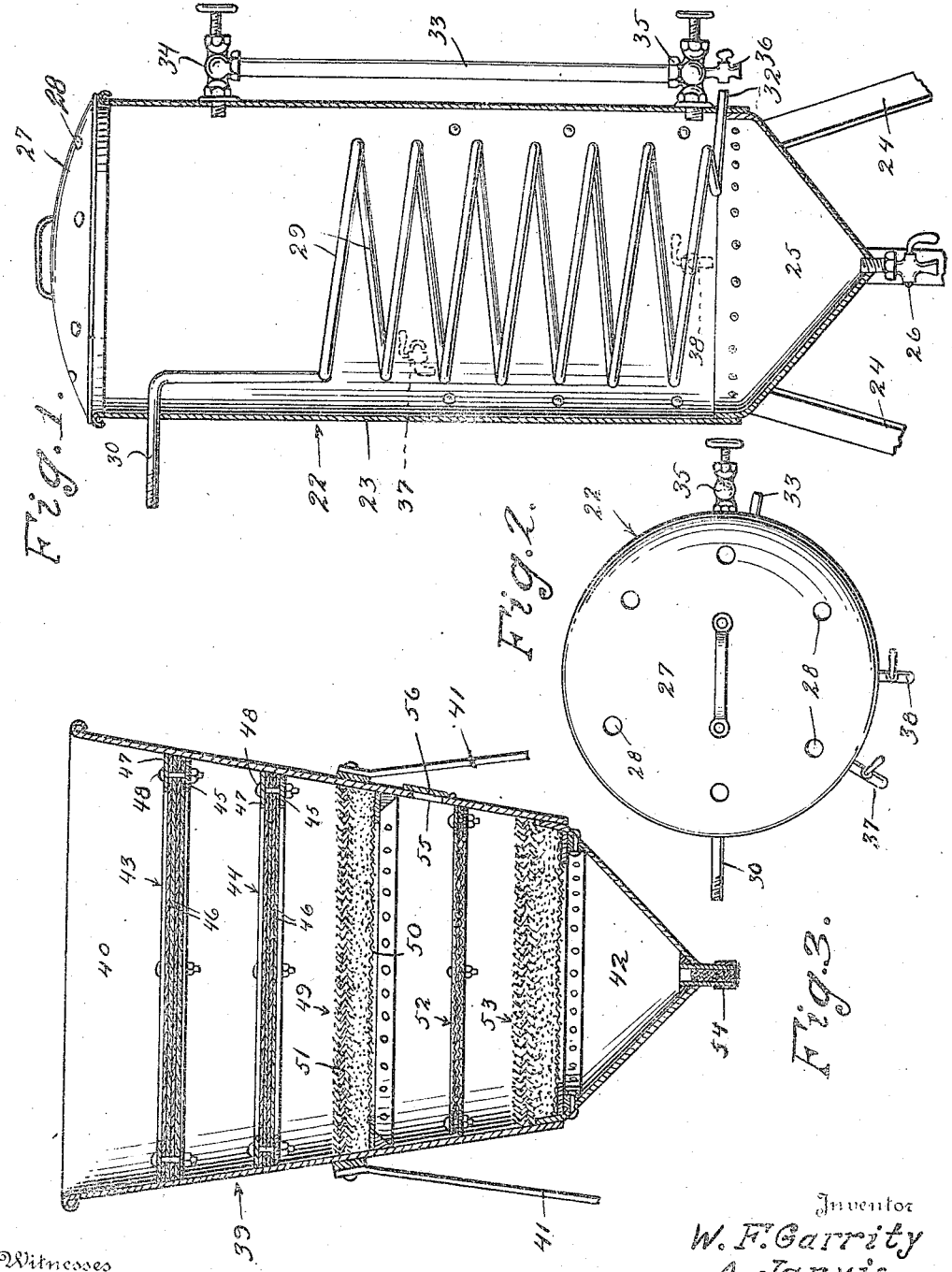

WILLIAM F. GARRITY AND ARTHUR JARVIS, OF BAYONNE, NEW JERSEY.

PROCESS FOR PURIFYING OIL.

1,190,538.   Specification of Letters Patent.   Patented July 11, 1916.

Application filed June 1, 1914. Serial No. 842,142.

*To all whom it may concern:*

Be it known that we, WILLIAM F. GARRITY and ARTHUR JARVIS, citizens of the United States, residing at Bayonne, in the county of Hudson, State of New Jersey, have invented certain new and useful Improvements in Processes for Purifying Oil; and we hereby declare the following to be a full, clear, and exact description of the invention, such as will enable others skilled in the art to which it appertains to make and use the same.

This invention relates to a process for purifying oil and has for its object to provide the means, whereby lubricating oil may be cleaned and restored to its former purified state.

An important object resides in the treatment of dirty and used lubricating oil, whereby the same is purified and rendered in proper condition for re-use.

With these and other objects and advantages in view, the invention consists in the novel construction, arrangement and combination of parts to be hereinafter more fully described and claimed and illustrated in the accompanying drawing, in which—

Figure 1 is a vertical sectional view through the oil boiling tank, Fig. 2 is a top plan view thereof, and Fig. 3 is a vertical sectional view through the novel purifying device.

In order to provide means whereby the oil to be treated may be purified, we provide a novel boiler structure, designated as a whole by the numeral 22 and comprising a shell 23 mounted upon suitable legs 24. The shell 23 is closed at its lower end by a conical portion 25 in the apex of which is threaded a draw-off cock 26, and has its upper end closed by a cap 27 provided with a plurality of openings 28. A coil 29 formed of tubing, such as copper or the like, has one end 30 extending through the side of the shell 23 for connection with a steam supply pipe. The steam within the coil 29, heats the oil within the boiler 22, thus disintegrating the oil and the impurities carried thereby. The coil 29 extends through the greater portion of the shell 23 and has its other end 32 discharging into the atmosphere. The shell 23 is adapted to contain oil to be purified, the oil being poured into the shell by removing the cap 27. The height of the oil can be seen by means of a sight glass 33 connected with the shell 23 by suitable connections 34 and 35, the lower connection 35 being provided with a draw-off cock 36. After oil is poured into the shell 23, steam is allowed to enter the coil 29, whereupon the oil will be heated and boiled, the vapor escaping through the openings 28. After the oil has boiled a short time, the dirt and foreign matter contained therein will be loosened and will settle in the bottom of the shell. As the boiling continues, the oil in the upper part of the shell will become clear first and its condition may be seen by looking into the sight glass 33. After the upper part of the oil has become sufficiently clear, it may be drawn off through a draw off cock 37, after which the boiling may continue. We have found by experience that boiling the oil about two hours is sufficient to loosen up the carbon, dirt and other foreign matter mixed in with the oil. After the oil has been boiled long enough, it may be allowed to settle, whereupon the dirt and foreign matter will settle into the conical bottom 25 in the form of a sediment, from which it may be drawn through the cock 26, the clear oil being drawn off through a cock 38. If any appreciable amount of carbon or other undesired matter should collect in the sightglass 33, it may be drawn off through the cock 36. After the oil has been thus boiled, it should be filtered. To accomplish this we provide a novel filter designated as a whole by the numeral 39 and comprising a shell 40 supported upon suitable legs 41. The bottom of the shell 40 is closed by a conical portion 42. Disposed in the upper portion of the shell 40 is a pair of filtering screens 43 and 44 which are similar in construction, each of which comprises a ring 45 upon which is disposed sheet cotton placed between layers of preferably Turkish toweling 46. The cotton and toweling 46 is supported upon the ring 45 by a second ring 47 which is secured in place by clamping bolts 48.

Disposed below the filtering screen 44 is a filter 49 secured within the shell 40 and comprising a ring 50 which carries a sheet of suitable cloth upon which is disposed a quantity of fullers' earth 51. Disposed below the filter formed by the fullers' earth is a third filtering screen 52, identical in construction with the screens 43 and 44, and disposed below the screen 52 is an additional filtering means 53 comprising fullers' earth and identical in construction with the filter 49. The apex of the conical bottom 42 is provided with an outlet 54 within which is disposed cotton.

After the oil has been boiled, it is poured into the filter 39, whereupon it passes through the screen 43, the screen 44, the fullers' earth filter 49, then through the screen 52, through the filter 53 of fullers' earth into the conical bottom 42 and then out through the discharge pipe 54. The interposition of the screen 52 between the filters 49 and 53 prevents the oil from dropping too heavily upon the filter 53. In order to expedite the cooling of the oil and to aerate it, we provide a vent 55 in the shell 40 between the filter 49 and the screen 52 and closable by a sliding plate 56. It is of course obvious that when the oil is passed through the various filtering screens and the fullers' earth, the foreign matter in the oil will be positively removed.

It will be readily understood that we reserve the right to make various changes in the form, construction and arrangement of parts without departing from the spirit of the invention or limiting the scope of the sub-joined claims.

Having thus described our invention, we claim:

1. The process of purifying lubricating oil consisting in boiling the oil, and then passing it through filtering screens composed of sheets of cotton held between sheets of Turkish toweling.

2. The process of purifying lubricating oil consisting in boiling the oil, and then passing it through alternate filters of sheets of cotton disposed between sheets of Turkish toweling, and layers of fullers' earth.

In testimony whereof we affix our signatures, in the presence of two witnesses.

WILLIAM F. GARRITY.
ARTHUR JARVIS.

Witnesses:
ERNEST SHERWIN,
JOHN J. WICKEREATY.